United States Patent [19]

Hattori et al.

[11] Patent Number: 4,906,706

[45] Date of Patent: Mar. 6, 1990

[54] MODIFIED CONJUGATED DIENE POLYMER AND PROCESS FOR PRODUCTION THEREOF

[75] Inventors: Iwakazu Hattori, Aichi; Mitsuhiko Sakakibara; Fumio Tsutsumi, both of Yokkaichi; Masao Yoshizawa, Kameyama, all of Japan

[73] Assignee: Japan Synthetic Rubber Co., Ltd., Tokyo, Japan

[21] Appl. No.: 90,347

[22] Filed: Aug. 28, 1987

[30] Foreign Application Priority Data

Sep. 5, 1986 [JP] Japan .................................. 61-207748
May 29, 1987 [JP] Japan .................................. 62-133898
Jun. 6, 1987 [JP] Japan .................................. 62-141944

[51] Int. Cl.$^4$ .......................... C08F 8/00; C08F 36/00
[52] U.S. Cl. ................................. 525/343; 525/359.1; 525/352; 525/374; 525/385; 526/135
[58] Field of Search .............. 525/343, 348, 349, 352, 525/359.1, 374, 384, 385

[56] References Cited

U.S. PATENT DOCUMENTS

| | | | |
|---|---|---|---|
| 3,920,773 | 11/1975 | Pampus | 525/333.2 |
| 4,012,566 | 3/1977 | Zelinski | 525/333.2 |
| 4,461,883 | 7/1984 | Takeuchi | 526/139 |
| 4,550,142 | 10/1985 | Akita | 525/333.2 |
| 4,647,625 | 3/1987 | Aonuma | 528/232 |
| 4,677,153 | 6/1987 | Kitahara | 524/552 |
| 4,704,427 | 11/1987 | Kitahara | 524/531 |

FOREIGN PATENT DOCUMENTS

| | | |
|---|---|---|
| 1390504 | 1/1965 | France . |
| 1466025 | 12/1966 | France . |
| 58-1709 | 1/1983 | Japan . |
| 58-53908 | 3/1983 | Japan . |
| 58-57410 | 4/1983 | Japan . |
| 60-40109 | 3/1985 | Japan . |
| 1001352 | 8/1965 | United Kingdom . |
| 1115782 | 5/1968 | United Kingdom . |

OTHER PUBLICATIONS

Polymer, 26 152 (1985).
Polymer Science USSR, vol. 26, No. 6, 1984, pp. 1251-1268, Pergamon Press Ltd., Oxford, GB; N.G. Marina et al., "Polymerisation of Dienes on Lanthanide ...".
Rubber Chemistry and Technology, vol. 58, 1985, pp. 117-145.

Primary Examiner—Christopher Henderson
Attorney, Agent, or Firm—Oblon, Spivak, McClelland, Maier & Neustadt

[57] ABSTRACT

A process for producing a modified conjugated diene polymer which comprises the steps of (I) polymerizing a conjugated diene in an inert organic solvent in the presence of a catalyst comprising (a) a lanthanum series rare earth element compound, (b) an organoaluminum compound represented by the general formula, $AlR^1R^2R^3$ (wherein $R^1$, $R^2$ and $R^3$ which may be same or different, are hydrogen atoms or hydrocarbon groups of 1 to 8 carbon atoms and at least one of $R^1$, $R^2$ and $R^3$ is said hydrocarbon group) and, if necessary, at least one member selected from the group consisting of (c) a Lewis acid and/or (d) a Lewis base, and then (II) modifying the resulting reactive polymer with a modifying compound selected from the group consisting of the following components (e), (f) and (g): (e) an organometal halide compound represented by the general formula, $R_n{}^4MX_{4-n}$ (wherein $R^4$ is an alkyl group of 1 to 20 carbon atoms or an aryl group, M is a tin or germanium atom, X is a halogen atom, and n is an integer of 1 to 3), (f) a heterocumulene compound or a three-membered heterocyclic compound having, in the molecule, a bond represented by the general formula,

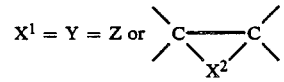

(wherein $X^1$ is a carbon, nitrogen, oxygen or sulfur atom, Y is a carbon or sulfur atom, Z is a nitrogen, oxygen or sulfur atom, and $X^2$ is a nitrogen, oxygen or sulfur atom), and (g) a halogen compound having, in the molecule, a bond represented by the general formula, (Abstract continued on next page.)

---

(A) TRANSITION METAL COMPONENT

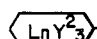

(B) ORGANOMETAL COMPONENT

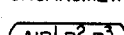

(C) THIRD COMPONENT (LEWIS ACID)

(LEWIS BASE)

(CONJUGATED DIENE)

PRESENT SPECIFIC COMPOUND (AGING) → CONJUGATED DIENE POLYMER → REACTION → MODIFIED CONJUGATED DIENE POLYMER $$Y^1 = \overset{|}{C} - X$$

(wherein $Y^1$ is a nitrogen or oxygen atom and X is a halogen atom). Said modified conjugated diene polymer has excellent characteristics in wear resistance, heat generation, mechanical properties, etc.

23 Claims, 11 Drawing Sheets

GPC CHART (EX. 8)

FIG. 3 INFRARED ABSORPTION SPERTRUM (EX. 8)

FIG. 5 INFRARED ABSORPTION (COMP. EX. 4)

GPC CHART (EX. 9)

GPC CHART (EX. 11)

GPC CHART (EX. 13)

FIG. 10 INFRARED ABSORPTION SPECTRUM (EX. 15)

GPC CHART (EX. 16)

GPC COUNT

MODIFIED CONJUGATED DIENE POLYMER AND PROCESS FOR PRODUCTION THEREOF

This invention relates to a novel process for producing a modified conjugated diene polymer having excellent wear resistance and excellent mechanical characteristics, by polymerizing a conjugated diene with a lanthanum series rare earth metal catalyst and reacting the resulting reactive polymer with a specific compound. This invention further relates to a novel modified conjugated diene polymer produced according to said process.

In recent years, requirements of higher durability and longer life for component rubbers are increasing. Hence, it has become necessary to improve rubbers in such characteristics as wear resistance, mechanical properties, heat generation and the like.

Polybutadienes (rubbery polymer) obtained using a catalyst composed mainly of nickel, cobalt, titanium, etc. have been poor in wear resistance.

Meanwhile, known rubbery polymers having excellent wear resistance are polybutadienes produced using a lanthanum series rare earth metal catalyst. Of these polybutadienes, one produced using a lanthanum series rare earth metal catalyst proposed by the present inventors in Japanese Patent Application Kokai (Laid-Open) No. 57410/1983 has particularly excellent wear resistance.

Japanese Patent Application Kokai (Laid-Open) No. 40109/1985 describes that the reaction between (a) a polybutadiene produced using a lanthanum series rare earth metal catalyst and (b) a tetrahalomethane alone or in admixture with a specific organoaluminum compound enables production of a polybutadiene with an improved processability.

However, these polybutadienes are yet insufficient in wear resistance.

This invention has been accomplished in order to solve the above-mentioned problems of the conventional techniques. This invention aims at providing a process for producing a modified conjugated diene polymer satisfying all of wear resistance, mechanical characteristics and low heat generation, as well as the modified conjugated diene polymer produced by said process.

Other objects and advantages of this invention will become apparent from the following description and accompanying drawings. In the accompanying drawings, FIG. 1 illustrates an example of the method for preparing the catalyst used in this invention;

Figure 1:
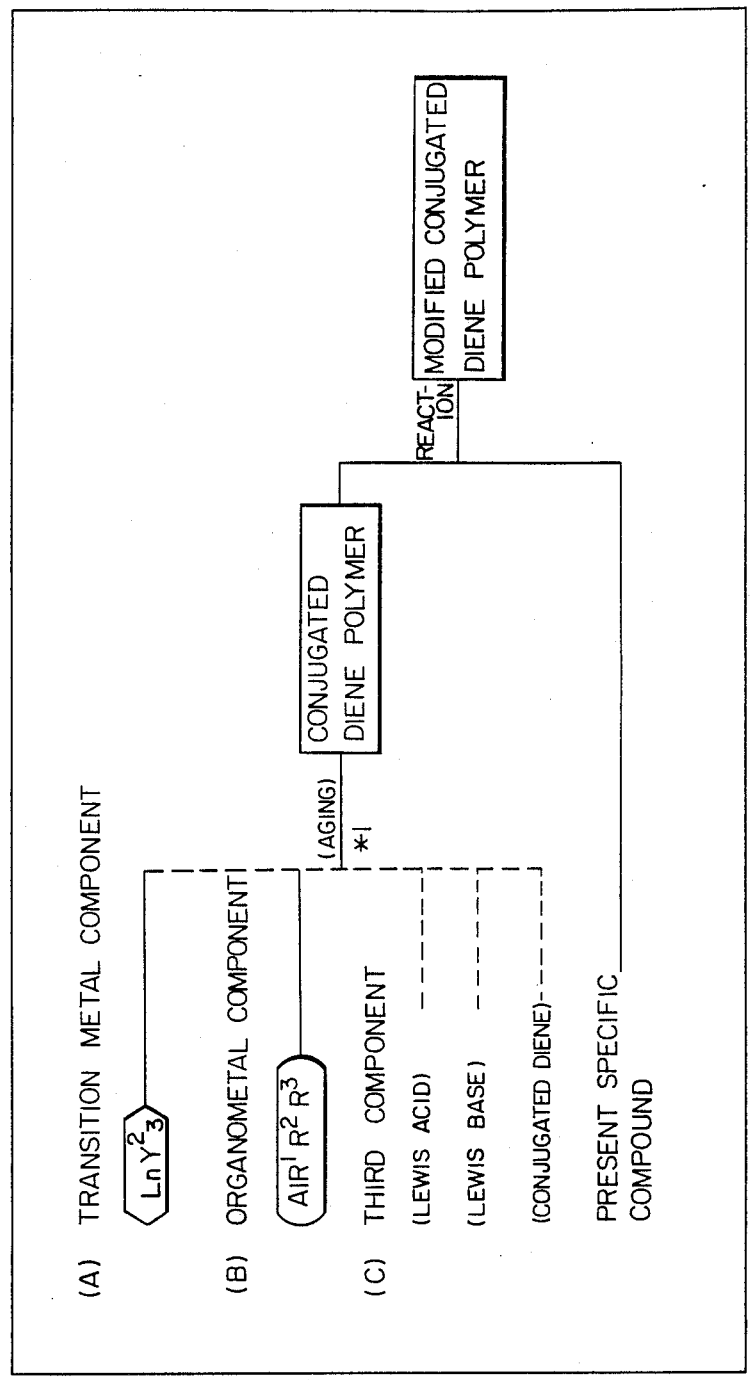

According to this invention, there is provided a process for producing a modified conjugated diene polymer which comprises the steps of (I) polymerizing a conjugated diene in an inert organic solvent in the presence of a catalyst comprising (a) a lanthanum series rare earth element compound, (b) an organoaluminum compound represented by the general formula, $AlR^1R^2R^3$ (wherein $R^1$, $R^2$ and $R^3$, which may be the same or different, are hydrogen atoms or hydrocarbon groups of 1 to 8 carbon atoms and at least one of $R^1$, $R^2$ and $R^3$ is said hydrocarbon group) and, if necessary, (c) a Lewis acid and/or (d) a Lewis base and (II) reacting the resulting reactive polymer with a modifying compound selected from the group consisting of the following components (e), (f) and (g): (e) an organometal halide compound represented by the general formula, $R^4{}_n MX_{4-n}$ (wherein $R^4$ is an alkyl group of 1 to 20 carbon atoms or an aryl group, M is a tin or germanium atom, X is a halogen atom, and n is an integer of 1 to 3), (f) a heterocumulene compound or a three-membered heterocyclic compound having, in the molecule, a bond represented by the general formula,

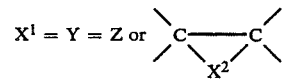

(wherein $X^1$ is a carbon, nitrogen, oxygen or sulfur atom, Y is a carbon or sulfur atom, Z is a nitrogen, oxygen or sulfur atom, and $X^2$ is a nitrogen, oxygen or sulfur atom), (g) a halogenated compound having, in the molecule, a bond represented by the general formula,

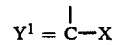

(wherein $Y^1$ is a nitrogen or oxygen atom, and X is a halogen atom).

This invention further provides the modified conjugated diene polymer thus produced.

According to this invention, various characteristics such as wear resistance, low heat generation, mechanical characteristics, etc. of a conjugated diene polymer, for example, polybutadiene can be improved by reacting a reactive polymer just produced by polymerizing a conjugated diene using a lanthanum series rare earth metal catalyst, with a specific compound.

The lanthanum series rare earth metal catalyst used in this invention is a catalyst system comprising (a) a lanthanum series rare earth metal compound [hereinafter referred to as the component (a)] and (b) an organoaluminum compound represented by the general formula, $AlR^1R^2R^3$ [hereinafter referred to as the component (b)]. This catalyst system can further comprise, if necessary, (c) a Lewis acid [hereinafter referred to as the component (c)] and/or (d) a Lewis base [hereinafter referred to as the component (d)].

As the lanthanum series rare earth metal compound which is the component (a), there can be preferably used compounds represented by the general formula, $LnY^2{}_3$. Here, Ln is a lanthanum series rare earth element having an atomic number of 57 to 71 in the Periodic Table, and cerium, lanthanum, praseodyminum, neodyminum and gadolinium are preferred. Of these, neodymium is particularly preferred because of its easy commercial availability. These rare earth elements may be used alone or in admixture of at least two.

$Y^2$ is a hydrocarbon residue, an alkoxide residue, a thioalkoxide residue, an amide residue, a phosphoric acid salt residue, a phosphorous acid salt residue, a halide residue or a carboxylic acid salt residue. Of these, an alkoxide residue, a halide residue and a carboxylic acid salt residue are particularly preferred.

The hydrocarbon type compound of lanthanum series rare earth element includes compounds represented by the general formula, $LnR_3$ (wherein R is a hydrocarbon group of 1 to 20 carbon atoms, such as a benzyl group, a phenyl group, a butyl group, a cyclopentadienyl group or the like).

The alcohol type compound (alkoxide) includes compounds represented by the general formula, $Ln(OR)_3$ (wherein Ln and R have the same definitions as given previously). Preferred as the alcohol are 2-ethylhexyl alcohol, oleyl alcohol, stearyl alcohol, phenol, benzyl alcohol, etc.

The thioalcohol type compound (thioalkoxide) includes compounds represented by the general formula, $Ln(SR)_3$ (wherein Ln and R have the same definitions as given previously). Preferred as the thioalcohol is thiophenol.

The amide type compound (amide) includes compounds represented by the general formula, $Ln(NR_2)_3$ (wherein Ln and R have the same definitions as given previously). Preferred as the amine are dihexylamine and dioctylamine.

The phosphoric acid salt of rare earth element includes compounds represented by the general formula,

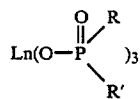

(wherein Ln has the same definition as given previously, and R and R' may be the same or different, R' has the same definition as that of R mentioned above). Preferred as the salt are neodymium tris(dihexyl phosphate) and neodymium tris(diphenyl phosphate).

The phosphorous acid salt of rare earth element includes compounds represented by the general formula,

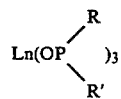

(wherein Ln, R and R' have the same definitions as given previously). Preferred as the salt are neodymium tris(dihexyl phosphite) and neodymium tris[di(ethylhexyl) phosphite].

The halide type compound includes compounds represented by the general formula, $LnX_3$ (wherein Ln has the same definition as given previously and X is a halogen atom). Preferred as the halogen atom are chlorine, bromine and iodine atoms.

The carboxylic acid salt of rare earth element includes compounds represented by the general formula, $(RCOO)_3Ln$ (wherein R is a hydrocarbon group of 1 to 20 carbon atoms, preferably a saturated or unsaturated alkyl group of straight, branched or cyclic chain, and the carboxyl group bonds to a primary, secondary or tertiary carbon atom). Preferred as the carboxylic acid are octanoic acid, 2-ethylhexanoic acid, oleic acid, stearic acid, benzoic acid and naphthenic acid.

Specific examples of the component (a) include neodymium trichloride, didymium trichloride (didymium is a rare earth metal mixture consisting of 72% by weight of neodymium, 20% by weight of lanthanum and 8% by weight of praseodymium), neodymium 2-ethylhexanoate, didymium 2-ethylhexanoate, neodymium naphthenate, neodymium 2,2-diethylhexanoate, neodymium trimethacrylate and polymers of neodymium trimethacrylate.

The organoaluminum compound which is the component (b) is a compound represented by the general formula, $AlR^1R^2R^3$ (wherein $R^1$, $R^2$ and $R^3$, which may be the same or different, are hydrogen atoms or hydrocarbon groups of 1 to 8 carbon atoms, and at least one of them is said hydrocarbon group). Specific examples of the component (b) include trimethylalminum, triethylaluminum, triisopropylalminum, tributylaluminum, triisobutylaluminum, trihexylaluminum, tricyclohexylaluminum, diisobutylaluminum hydride, diethylaliminum hydride, dipropylaluminum hydride, ethylalunimum dihydride, propylaluminum dihydride and isobutylaluminum dihydride.

The Lewis acid which is the component (c) includes, for example, aluminum halide compounds represented by the general formula, $AlR^5{}_mS_{3-m}$ (wherein $R^5$ is a hydrocarbon group of 1 to 8 carbon atoms, m is 0 or a positive number of 1 to 3, and X is a halogen atom), halogen atoms, and halides of tin, titanium and the like. Of these, particularly preferred are dimethylaluminum chloride, diethylalunimum chloride, dibutylaluminum chloride, ethylaluminum sesquichloride, ethylaluminum dichloride, and bromides and iodides corresponding to them.

The Lewis base which is the component (d) includes acetylacetone, tetrahydrofuran, pyridine, N,N-dimethylformamide, thiophene, diphenyl ether, triethylamine, organic phosphorous compounds and mono- or dihydric alcohols.

The lanthanum series rare earth metal catalyst used in this invention has the following conditions:

The mole ratio of the component (b)/the component (a) is preferably from 10 to 150, more preferably from 15 to 100. When the ratio is smaller than 10, the catalyst has a low polymerization activity. When the ratio is more than 150, the polymerization activity is not any more increased and such a high mole ratio is disadvantageous economically.

The mole ratio of the component (c)/the component (a) is preferably from 0 to 6, more preferably from 0.5 to 5.0. When the ratio exceeds 6, the polymerization activity tends to decrease.

The mole ratio of the component (d)/the component (a) is preferably from 0 to 20, more preferably from 1 to 15. When the ratio exceeds 20, the polymerization activity tends to decrease.

If necessary, the catalyst of this invention may further comprise, in addition to the components (a), (b), (c) and (d), a conjugated diene in an amount of 0 to 50 moles per mole of the lanthanum series rare earth metal compound which is the component (a). The conjugated diene used in preparation of the catalyst is the same as the monomer used in polymerization and may be isoprene, 1,3-butadiene, 1,3-pentadiene or the like. The conjugated diene as a catalyst component is not essential, but its use in the catalyst can noticeably enhance the activity of the catalyst.

The preparation of the catalyst if conducted, for example, by subjecting the components (a) to (d) dissolved in a solvent and, if necessary, the conjugated diene to reaction. In this case, the addition order of each component is not critical. It is preferable to previously mix these components and subject the mixture to reaction and aging from the standpoints of enhancement of polymerization activity and shortening the induction period for polymerization initiation. It is also possible to successively add the catalyst components directly to a mixture of a polymerization solvent and a monomer to be polymerized, during the polymerization.

An example of the preparation method of the catalyst used in this invention is illustrated in FIG. 1. As shown in FIG. 1, the lanthanum series rare earth metal catalyst used in this invention consists of (A) a lanthanum series rare earth metal compound (a) which is a transition metal component, (B) an organoaluminum compound (b) which is an organometal component, and, if necessary, (C) a Lewis acid (c) and/or a Lewis base (d), both of which are a third component, and the addition order of these components (a) to (d) in the preparation of the catalyst is not critical.

In the catalyst preparation, it is preferable to contact the component (a) with the component (d), though the addition order of the other components is not critical.

The polymerization solvent is an inert organic solvent. It includes aromatic hydrocarbons such as benzene, toluene, xylene and the like; aliphatic hydrocarbons such as n-pentane, n-hexane, n-butane, cyclohexane and the like; alicyclic hydrocarbons such as methylcyclopentane, cyclohexane and the like; and halogenated hydrocarbons such as ethylene dichloride, chlorobenzene and the like. These solvents can be used alone or in admixture of two or more.

The polymerization temperature is preferably −20° C. to 150° C., more preferably 30° to 120° C. The polymerization reaction can be conducted batchwise or continuously.

The monomer concentration in the polymerization solvent is preferably 5 to 50% by weight, more preferably 10 to 35% by weight.

In order for the lanthanum series rare earth metal catalyst and the formed polymer not to lose their activity during the polymerization, attention should be paid so that substances having a deactivating effect, such as oxygen, water and carbon dioxide cannot be introduced into the polymerization system.

In this invention, the organometal halide compound (e) to be allowed to react with the reactive polymer is represented by the general formula:

$$R^4{}_n MX_{4-n}$$

wherein $R^4$ is an alkyl group of 1 to 20 carbon atoms or an aryl group, M is a tin or germanium atom, X is a halogen atom, and n is an integer of 1 to 3.

When M is a tin atom, the component (e) is, for example, triphenyltin chloride, tributyltin chloride, triisopropyltin chloride, diphenyltin dichloride, dioctyltin dichloride, dibutyltin dichloride, phenyltin trichloride, butyltin trichloride or the like.

When M is a germanium atom, the component (e) is, for example, triphenylgermanium chloride, dibutylgermanium dichloride, diphenylgermanium dichloride, butylgermanium trichloride or the like.

These components (e) can be co-used at any ratio.

The mole ratio of the component (e) to the component (a) is preferably from 0.1 to 100, more preferably from 0.5 to 50. When the mole ratio is less than 0.1, the modification reaction does not proceed sufficiently and, in addition, the improvement effect on wear resistance is insufficient. When the mole ratio exceeds 100, the improvement effect does not increase any further and, in some cases, toluene insolubles (gel) are formed.

The modification reaction is effected at a temperature of preferably 160° C. or less, more preferably 0° to 130° C., for a period of preferably 0.1 to 10 hours, more preferably 0.2 to 5 hours, with stirring.

In this invention, the heterocumulene compound to be allowed to react with the reactive polymer is a compound having a bond represented by the general formula:

$$X^1=Y=Z$$

wherein $X^1$ is a carbon, nitrogen, oxygen or sulfur atom, Y is a carbon or sulfur atom, and Z is a nitrogen, oxygen or sulfur atom [this compound is hereinafter referred to as the component (f-1)].

The component (f-1) is a ketene compound when $X^1$ is a carbon atom, Y is a carbon atom and Z is an oxygen atom; a thioketene compound when $X^1$ is a carbon atom, Y is a carbon atom and Z is a sulfur atom; an isocyanate compound when $X^1$ is a nitrogen atom, Y is a carbon atom and Z is an oxygen atom; a thioisocyanate compound when $X^1$ is a nitrogen atom, Y is a carbon atom and Z is a sulfur atom; a carbodiimide compound when $X^1$ is a nitrogen atom, Y is a carbon abom and Z is a nitrogen atom; carbon dioxide when $X^1$ is an oxygen atom, Y is a carbon atom and Z is an oxygen atom; carbonyl sulfide when $X^1$ is an oxygen atom, Y is a carbon atom and Z is a sulfur atom; sulfur dioxide when $X^1$ is an oxygen atom, Y is a sulfur atom and Z is an oxygen atom; and carbon disulfide when $X^1$ is a sulfur atom, Y is a carbon atom and Z is a sulfur atom.

However, the component (f-1) is not restricted to these combinations.

Specific examples of the ketene compound are ethylketene, butylketene, phenylketene and toluylketene.

Specific examples of the thioketene compound are ethylthioketene, butylthioketene, phenylthioketene and toluythioketene.

Specific examples of the isocyanate compound are phenyl isocyanate, 2,4-tolylene diisocyanate, 2,6-tolylene diisocyanate, diphenylmethane diisocyanate, the polymeric type of diphenyl methane diisocyanate, isophorone diisocyanate and hexamethylene diisocyanate.

Specific examples of the thioisocyanate compound are phenyl thioisocyanate, 2,4-tolylene dithioisocyanate and hexamethylene dithioisocyanate.

Specific examples of the carbodiimide compound are N,N'-diphenylcarbodiimide and N,N'-diethylcarbodiimide.

In this invention, the three-membered heterocyclic compound to be allowed to react with the reactive polymer is a compound having a bond represented by the general formula:

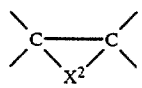

wherein $X^2$ is a nitrogen, oxygen or sulfur atom [this compound is hereinafter referred to as the component (f-2)].

The component (f-2) is an ethyleneimine derivative when $X^2$ is a nitrogen atom; an epoxy compound when $X^2$ is an oxygen atom; and a thiirane compound when $X^2$ is a sulfur atom.

Specific examples of the ethyleneimine derivative are ethyleneimine, propyleneimine, N-phenylethyleneimine and N-(β-cyanoethyl)ethyleneimine.

Specific examples of the epoxy compound are ethylene oxide, propylene oxide, cyclohexene oxide, styrene oxide, epoxidized soybean oil and epoxidized natural rubber.

Specific examples of the thiirane compound are thiirane, methylthiirane and phenylthiirane.

The mole ratio of the component (f) to the component (a) is preferably 0.1 to 200, more preferably 0.5 to 100. When the mole ratio is less than 0.1, the modification reaction does not proceed sufficiently and the improvement effect on wear resistance is insufficient. When the mole ratio exceeds 200, no further improvement effect is seen, and such a ratio is disadvantageous economically.

The modification reaction using the component (f-1) or (f-2) is effected at a temperature of preferably 160° C. or less, more preferably −30° C. to 130° C., for a period of preferably 0.1 to 10 hours, more preferably 0.2 to 5 hours, with stirring.

In this invention, the halogen compound (g) to be allowed to react with the reactive polymer has a bond represented by the general formula:

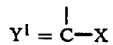

wherein $Y^1$ is a nitrogen or oxygen atom and X is a halogen atom such as a chlorine atom, a bromine atom, an iodine atom or the like.

The component (g) has a bond

when $Y^1$ is a nitrogen atom. Specific examples of such a compound are 2-amino-6-chloropyridine, 2,5-dibromopyridine, 4-chloro-2-phenylquinazoline, 2,4,5-tribromoimidazole, 3,6-dichloro-4-methylpyridazine, 3,4,5-trichloropyridazine, 4-amino-6-chloro-2-mercaptopyrimidine, 2-amino-4-chloro-6-methylpyrimidine, 2-amino-4,6-dichloropyrimidine, 6-chloro-2,4-dimethoxypyrimidine, 2-chloropyrimidine, 2,4-dichloro-6-methylpyrimidine, 4,6-dichloro-2-(methylthio)pyrimidine, 2,4,5,6-tetrachloropyrimidine, 2,4,6-trichloropyrimidine, 2-amino-6-chloropyrazine, 2,6-dichloropyrazine, 2,4-bis(methylthio)-6-chloro-1,3,5-triazine, 2,4,6-trichloro-1,3,5-triazine, 2-bromo-5-nitrothiazole, 2-chlorobenzothiazole and 2-chlorobenzoxazole.

The component (g) has a bond

when $Y^1$ is an oxygen atom. Specific examples of such a compound are propionyl chloride, octanoyl chloride, stearyl chloride, beazoyl chloride, phthalyl chloride and maleyl chloride.

Preferred as the component (g) are 2,4,6-trichloro-1,3,5-triazine and benzoyl chloride.

The mole ratio of the component (g) to the component (a) is preferably 0.1 to 200, more preferably 0.5 to 100. When the mole ratio is less than 0.1, the modification reaction does not proceed sufficiently and the improvement effect on wear resistance is insufficient. When the mole ratio exceeds 200, no further improvement effect is seen and such a ratio is disadvantageous economically.

The modification reaction with the component (g) is effected at a temperature of preferably 160° C. or less, more preferably −30° C. to 130° C., for a period of preferably 0.1 to 10 hours, more preferably 0.2 to 5 hours, with stirring.

After the completion of the modification reaction, steam is blown into the polymer solution to remove the solvent, or a poor solvent is added to the polymer solution to coagulate the modified polymer. The modified polymer thus recovered is then dried using a hot roll or under reduced pressure to obtain the objective polymer. Alternatively, the solvent can be removed directly from the polymer solution under reduced pressure to obtain the objective polymer.

The modified conjugated diene polymer obtained in this invention is of a high cis-1,4 diene polymer. When it is a modified polybutadiene, the cis-1,4 content is 70% or more, preferably 80% or more. When it is a modified polyisoprene, the cis-1,4 content is 88% or more. In the case of a high cis-1,4 butadiene-isoprene copolymer, the cis-1,4 content in the butadiene unit is 80% or more and the cis-1,4 content in the isoprene unit is 88% or more.

The proportions of butadiene and isoprene in this copolymer can be varied freely.

The modified conjugated diene polymer obtained in this invention may have a molecular weight varying over a wide range. Its Mooney viscosity ($ML_{1+4}$, 100° C.) is preferably 10 to 120, more preferably 15 to 100 though not critical.

The modified conjugated diene polymer, when it is a copolymer, can be obtained as a block copolymer or a random copolymer depending upon the structure of the reactive polymer.

The structure of the modified conjugated diene polymer of this invention can be confirmed, for example, by infrared absorption spectrum based on absorption due to Sn—φ bond in the vicinity of 700 cm$^{-1}$, absorption due to Sn—CH$_3$ in the vicinity of 770 cm$^{-1}$ and the like.

When the diphenyltin dichloride is used as the component (e), the structure can be confirmed by the Fourier transform NMR spectrometer (hereinafter referred to as FT-NMR) using tetramethylsilane as the standard substance based on the peak in the vicinity of $\delta = 7.4$ ppm due to Sn—φ bond.

In the modified conjugated diene polymer of this invention, the structure that a functional group is added to the conjugated diene polymer chain can be confirmed by infrared absorption spectrum from absorption due to hydroxyl group in the vicinity of 3,600 cm$^{-1}$ when the modification is effected with a ketene compound, from absorption due to mercapto group in the vicinity of 2,600 cm$^{-1}$ when the modification is effected with a thioketene compound, from absorption band of amide II in the vicinity of 1,530 cm$^{-1}$ and absorption band of amide I in the vicinity of 1,680 cm$^{-1}$ when the modification is effected with an isocyanate compound and from absorption due to carboxylic acid or carboxylic acid salt in the vicinity of 1,700 cm$^{-1}$ when the modification is effected with carbon dioxide depending upon the after-treatment method.

When a modifying agent having a UV-active functional group such as a phenyl group or the like is used, the modification of polymer can easily be confirmed by use of GPC using a ultraviolet ray of 2.54 nm as a detector and a differential refractiometer together.

In the modified conjugated diene polymer of this invention, the structure that a functional group is added to the polymer chain can be confirmed by infrared absorption spectrum from absorption due to —N=C< bond in the vicinity of 1,500–1,650 cm$^{-1}$ when the modification is effected with a compound having a

bond or from absorption in the vicinity of 1,650–1,750 cm$^{-1}$ when the modification is effected with a compound having a

bond.

In case the modifying component is not used, the molecular weight distribution of the resulting polybutadiene can not be determined by GPC using an ultraviolet ray of 254 nm as a detector.

However, when a phenyl group-containing compound, for example, is used as the modifying component, the molecular weight distribution of the resulting modified polymer determined by ultraviolet rays and the molecular weight distribution of the polymer determined by a differential refractometer can be correlated because of the presence of ultraviolet-ray absorption due to the phenyl group. From this correlation, the presence of the functional group in the modified polymer can be confirmed.

The modified conjugated diene polymer (I) of this invention can be used alone or in blend with 80% by weight or less of natural rubber (II) and/or other rubber (III) such as cis-1,4-polyisoprene, emulsion-polymerized styrene-butadiene copolymer, solution-polymerized styrene-butadiene copolymer, low cis-1,4-polybutadiene, high cis-1,4-polybutadiene, ethylenepropylene-diene copolymer, chloroprene, halogenated butyl rubber, NBR or the like. When it is used in blend, the blending ratio is preferably 20:80 to 90:10 in terms of weight ratio of (I):[(II)+(III)]. When the total content of (II) and (III) in the blend exceeds 80% by weight, the effect of this invention cannot be expected. The modified conjugated diene polymer of this invention or its blend can, if necessary, be extended with an aromatic, naphthenic or paraffinic oil and then mixed with conventional compounding agents for vulcanized rubber such as a filler (e.g. carbon black, silica, magnesium carbonate, calcium carbonate, glass fiber or the like), stearic acid, zinc white, an antioxidant, a vulcanizing accelerator and a vulcanizing agent, to form a rubber composition.

This rubber composition can be molded, vulcanized and then used in various applications such as tire (tread, undertread, carcass, side wall, bead), hose, belt, shoe sole, window frame, sealing material, rubber vibration insulator and other industrial applications.

This invention will be explained in more detail below referring to Examples, which are not by way of limitation but by way of illustration.

In the Examples, parts and % are by weight unless otherwise specified.

Various measurements in the Examples were made according to the following methods.

The reaction between a reactive polymer obtained by polymerization with a lanthanum series rare earth metal catalyst and a specific halogen compound was confirmed by examining the change of Mooney viscosity before and after the reaction, or by conducting a model reaction using a polymer having a number-average molecular weight of several thousands and subjecting the product to GPC and IR analysis.

Mooney viscosity

Measured according to JIS K 6300 (preheating: 1 minute; measurement: 4 minutes; and temperature: 100° C.).

Microstructure of polymer

Measured according to the IR absorption spectrum method (the Morero method).

The modified polymer obtained according to this invention was subjected to kneading with the following compounding recipe using a 230-cc Brabender and a 6-inch roll, and then the resulting compound was vulcanized at 145° C. for a predetermined period of time to obtain a vulcanizate. The vulcanizate was subjected to various measurements.

| Compounding recipe | | |
|---|---|---|
| Polymer | 100 | parts |
| Carbon black (HAF) | 50 | parts |
| Zinc white | 3 | parts |
| Stearic acid | 2 | parts |
| Antioxidant (810 NA*[1]) | 1 | part |
| Vulcanizing accelerator (TP*[2]) | 0.8 | part |
| Vulcanizing accelerator (MSA*[3]) | 1 | part |
| Sulfur | 1.5 | parts |

*[1]N—phenyl-N'—isopropyl-p-phenylenediamine
*[2]Sodium dibutyldithiocarbamate
*[3]N—oxydiethylene-2-benzothiazolesulfenamide Tensile characteristics and hardness Measured according to JIS K 6301.

Heat generation

Impact resilience (%) according to the Dunlop impact resilience test was used as a yardstick of heat generation. The measurement was made according to BS 903. A larger impact resilience (%) implies lower heat generation, which is desirable.

Abrasion

Measured according to ASTM D 2228 (the Pico method). A large Pico abrasion index implies superior abrasion resistance.

EXAMPLE 1

2.5 kg of cyclohexane and 500 g of 1,3-butadiene were placed in a reactor having an internal volume of 5 liters and equipped with a stirrer, in a nitrogen atmosphere. Separately, a catalyst was previously prepared by mixing (a) 0.93 mmol of neodymium 2-ethylhexanoate, (b) 27.7 mmol of triethylaluminum, (b) 10.2 mmol of diisobutylaluminum hydride, (c) 2.3 mmol of diethylaluminum chloride and (d) 1.85 mmol of acetylacetone in the presence of 4.6 mmol of 1,3-butadiene and aging the mixture at 40° C. for 30 minutes. This catalyst was added to the contents in the above reactor. The whole mixture was subjected to adiabatic reaction at 70° C. for 1.5 hours. The reaction conversion of 1,3-butadiene was almost 100%. In order to measure the Mooney viscosity of the formed polybutadiene, a part of the polymerization mixture was taken out, coagulated and dried. The drying product (polymer) has a Mooney viscosity of 49.

The polymerization mixture was cooled to 60° C. Thereto was added (e) 2.33 mmol of diphenyltin dichloride. The mixture was stirred for 30 minutes. Then, 3.0 g of 2,6-di-t-butyl-p-cresol was added. Steam was blown into the mixture for coagulation. The coagulation product was dried using a hot roll of 100° C. The modified poly(1,3-butadiene) thus obtained had such a microstructure that the cis-1,4 content was 97.3%, the trans-1,4 content was 1.3% and the vinyl content was 1.4%. Its Mooney viscosity was 64.

The evaluation results on the properties of the vulcanizate of the above modified poly(1,3-butadiene) are shown in Table 1.

COMPARATIVE EXAMPLES 1 AND 2

Comparative Example 1 is a case where no diphenyltin dichloride was used in Example 1. Comparative Example 2 is a case where a commercially available polybutadiene (BR-01 manufactured by Japan Synthetic Rubber Co., Ltd.) was vulcanized to obtain a vulcanizate. The evaluation results on the properties of the two vulcanizates are shown in Table 1.

As is appreciated from the comparison of Example 1 with Comparative Examples 1 and 2, the modified conjugated diene polymer of this invention obtained by reacting the reactive polymer just after polymerization using the lanthanum series rare earth metal catalyst, with diphenyltin dichloride has remarkably improved abrasion resistance.

EXAMPLES 2 TO 7

Example 2 is a case where the amount of diphenyltin dichloride used was increased as compared with Example 1. Examples 3 and 7 are cases where triphenyltin chloride was used in place of the diphenyltin dichloride in Example 1. Examples 4 and 5 are cases where phenyltin trichloride was used in place of the diphenyltin dichloride in Example 1. Example 6 is a case where dibutyltin dichloride was used in place of the diphenyltin dichloride in Example 1.

The evaluation results on the properties of each vulcanizate are shown in Table 1.

COMPARATIVE EXAMPLE 3

A poly(1,3-butadiene) was produced in the same manner as in Example 1, except that carbon tetrachloride was used in place of the diphenyltin dichloride. The results of polymerization and the evaluation results on the properties of the vulcanizate are shown in Table 1.

TABLE 1

| | Example 1 | Comparative Example 1 | Comparative Example 2 | Example 2 |
|---|---|---|---|---|
| Type of organometal halide [component (e)] | $\phi_2SnCl_2$ | Not used | — | $\phi_2SnCl_2$ |
| Mole ratio of component (e)/ component (a) | 2.5 | — | — | 5.0 |
| Mooney viscosity before and after addition of component (e) | | | | |
| Before addition | 49 | 51 | (44) | 54 |
| After addition | 64 | — | | 65 |
| Microstructure (%) | | | | |
| Cis-1,4 content | 97.3 | 96.6 | 95.3 | 96.8 |
| Trans-1,4 content | 1.3 | 1.5 | 2.1 | 1.4 |
| Vinyl content | 1.4 | 1.9 | 2.6 | 1.8 |
| Properties of vulcanizate Tensile characteristics | | | | |
| 200% modulus (kgf/cm$^2$) | 106 | 97 | 92 | 112 |
| 300% modulus (kgf/cm$^2$) | 171 | 158 | 140 | 178 |
| Tensile strength (kgf/cm$^2$) | 217 | 221 | 192 | 218 |
| Elongation at break (%) | 380 | 410 | 390 | 370 |
| Hardness (JIS A) | 73 | 73 | 71 | 75 |
| Dunlop impact resilience (%) | | | | |
| Room temperature | 63 | 64 | 59 | 66 |
| 50° C. | 66 | 65 | 60 | 66 |
| 80° C. | 67 | 66 | 63 | 67 |
| Pico abrasion index* | 129 | 107 | 100 | 123 |

| Example 3 | Example 4 | Example 5 | Example 6 | Example 7 | Comparative Example 3 |
|---|---|---|---|---|---|
| $\phi_3SnCl$ | $\phi SnCl_3$ | $\phi SnCl_3$ | $(n-Bu)_2SnCl_2$ | $\phi_3SnCl$ | $CCl_4$ |
| 10.0 | 1.7 | 3.3 | 5.0 | 30 | 25 |
| 77 | 51 | 54 | 48 | 25 | 48 |
| 86 | 52 | 55 | 61 | 48 | 48 |
| 96.9 | 97.0 | 97.3 | 96.4 | 96.4 | 96.3 |
| 1.3 | 1.3 | 1.4 | 1.7 | 1.8 | 1.7 |
| 1.8 | 1.7 | 1.3 | 1.9 | 1.8 | 2.0 |

TABLE 1-continued

| | | | | | |
|---|---|---|---|---|---|
| 115 | 97 | 100 | 115 | 98 | 96 |
| 176 | 157 | 162 | 183 | 155 | 159 |
| 220 | 205 | 209 | 221 | 201 | 220 |
| 370 | 400 | 390 | 380 | 360 | 400 |
| 75 | 73 | 75 | 74 | 73 | 73 |
| 67 | 63 | 65 | 67 | 66 | 63 |
| 67 | 64 | 66 | 67 | 66 | 64 |
| 69 | 66 | 68 | 68 | 67 | 65 |
| 120 | 126 | 126 | 127 | 116 | 106 |

Note:
*In this measurement, the abrasion loss of a vulcanizate of a commercially available polybutadiene JSR BR-01 measured according to the same Pico method was taken as a reference index of 100.

EXAMPLE 8

60 g of cyclohexane and 6 g of 1,3-butadiene were placed in a pressure bottle having an internal volume of 100 ml in a nitrogen atmosphere. Separately, a catalyst was previously prepared by mixing (a) 0.111 mmol of neodymium 2-ethylhexanoate, (b) 3.11 mmol of triethylaluminum, (b) 1.55 mmol of diisobutylaluminum hydride, (c) 0.222 mmol of diethylaluminum chloride and (d) 0.222 mmol of acetylacetone in the presence of 0.555 mmol of 1,3-butadiene, and aging the mixture at 40° C. for 30 minutes. This catalyst was added to the contents in the above pressure bottle. The whole mixture was subjected to adibatic reaction at 60° C. for 1 hour. The polymerization conversion of 1,3-butadiene was almost 100%.

To the polymerization mixture was added 0.74 mmol of (f) the polymeric type of diphenylmethane diisocyanate [PAPI-135 manufactured by MD Kasei K. K. (hereinafter referred to as C-MDI)].

The mixture was stirred for 1 hour and then coagulated with methanol. The resulting modified polymer was dissolved in toluene and the solution was coagulated with methanol. This procedure was repeated three times to completely remove the unreacted C-MDI. The resulting polymer was dried at room temperature under reduced pressure.

The thus obtained modified poly(1,3-butadiene) had such a microstructure that the cis-1,4 content was 97.0%, the trans-1,4 content was 1.5% and the vinyl content was 1.5%.

Figure 2:
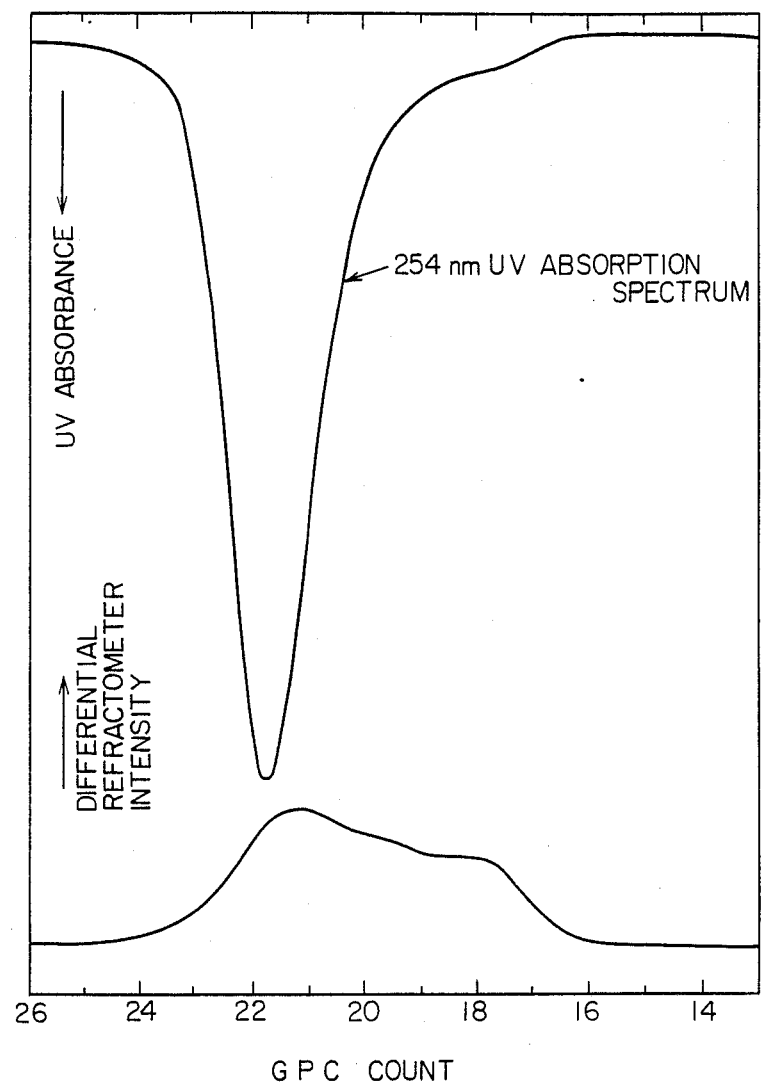
FIG. 2 is a GPC chart of a polymer obtained in Example 8.

The GPC chart of this modified polymer is shown in FIG. 2.

As is clear from FIG. 2, both the molecular weight distribution determined by a differential refractometer and the molecular weight distribution determined by an ultraviolet ray of 254 nm appear in correlation to GPC count, and the UV absorption spectrum shows higher absorption intensities at lower molecular weights and correlates to the number of polymer terminals.

Figure 3:
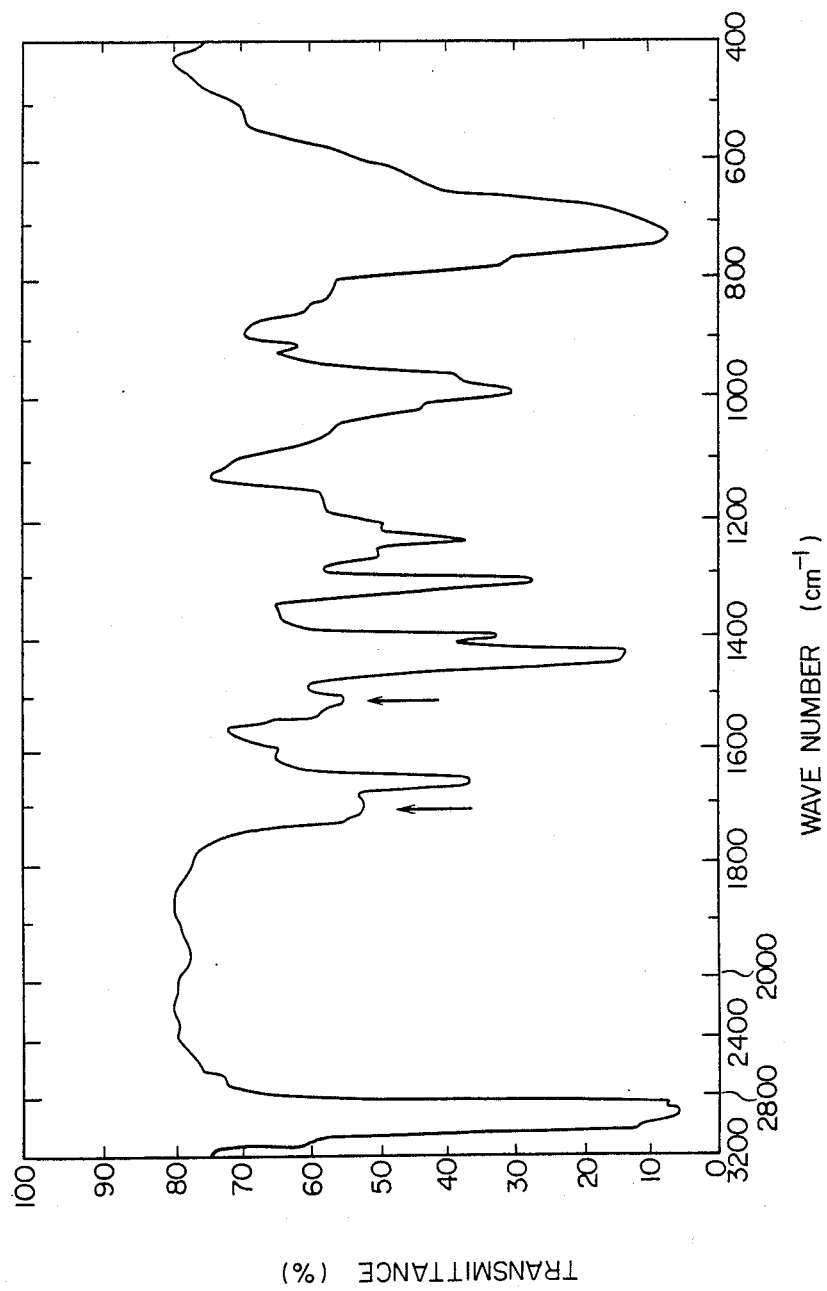
FIG. 3 is an IR absorption spectrum of the polymer.

The IR absorption spectrum of the modified polymer is shown in FIG. 3. As is clear from FIG. 3, an amide II absorption band appears in the vicinity of 1,520 cm$^{-1}$ and an amide I absorption band appears in the vicinity of 1,690 cm$^{-1}$; thus, C-MDI has been added to the polymer as a result of reaction.

The proportion of functional group added per chain of polymer was determined by a titration method and a polystyrene-reduced number-average molecular weight to be 45%.

COMPARATIVE EXAMPLE 4

A poly(1,3-butadiene) was obtained in the same manner as in Example 8, except that C-MDI as the component (f) was not used.

Figure 4:
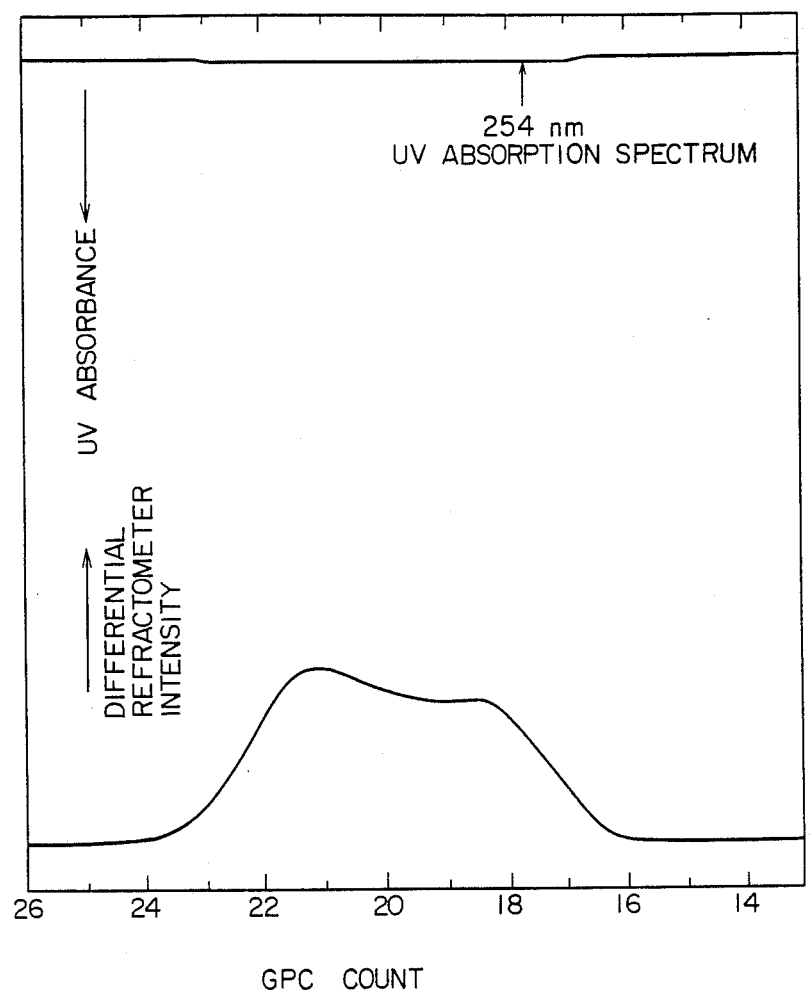
FIG. 4 is a GPC chart of a polymer obtained in Comparative Example 4.
Figure 5:
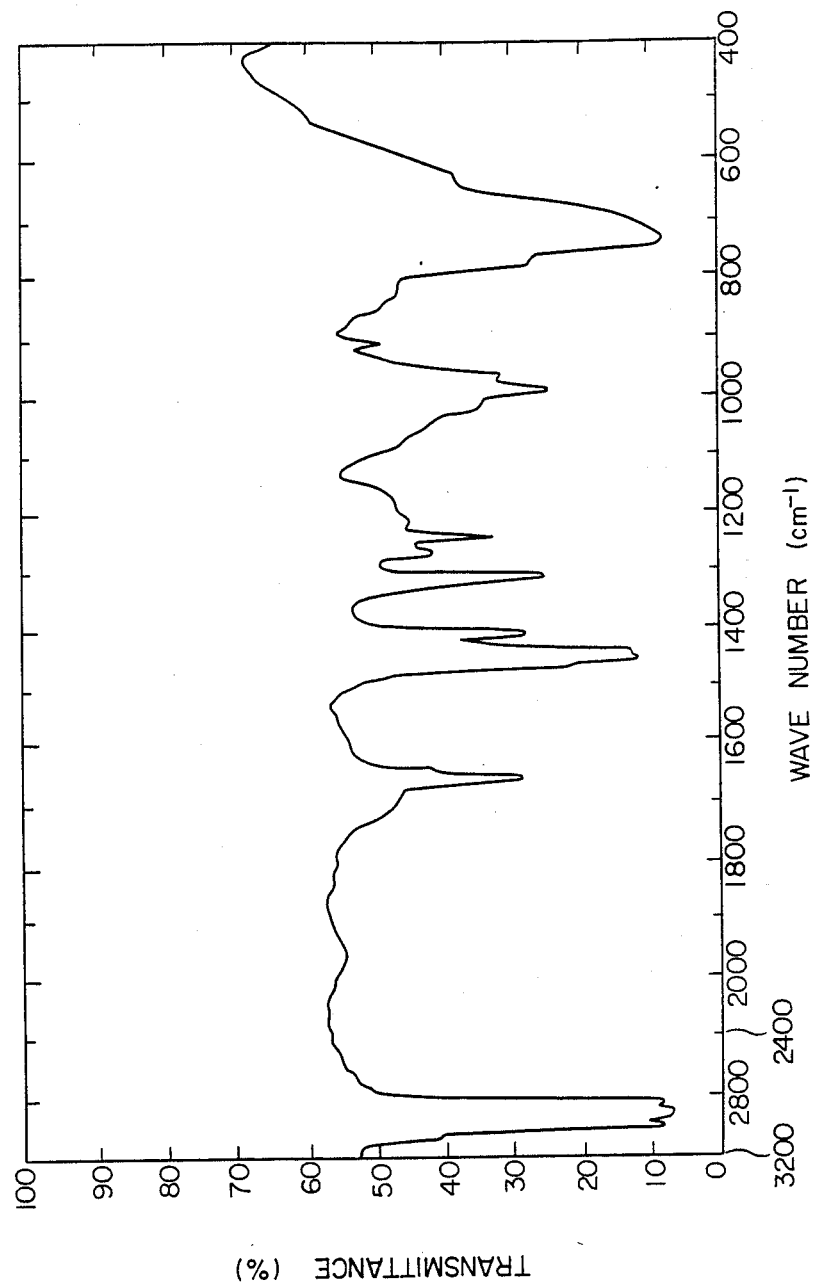
FIG. 5 is an IR absorption spectrum of the polymer.

The GPC chart and the IR absorption spectrum of the polymer are shown in FIG. 4 and FIG. 5, respectively.

As is appreciated from the comparison of Example 8 and Comparative Example 4, the modified polymer of this invention has a high cis-1,4 content and contains a functional group as a result of addition reaction; thus, it is a novel polymer different from conventional polymers.

EXAMPLE 9

The procedure of Example 8 was repeated, except that phenyl isocyanate as a component (f-1) was used in place of the C-MDI of Example 8 to effect polymer modification.

Figure 6:
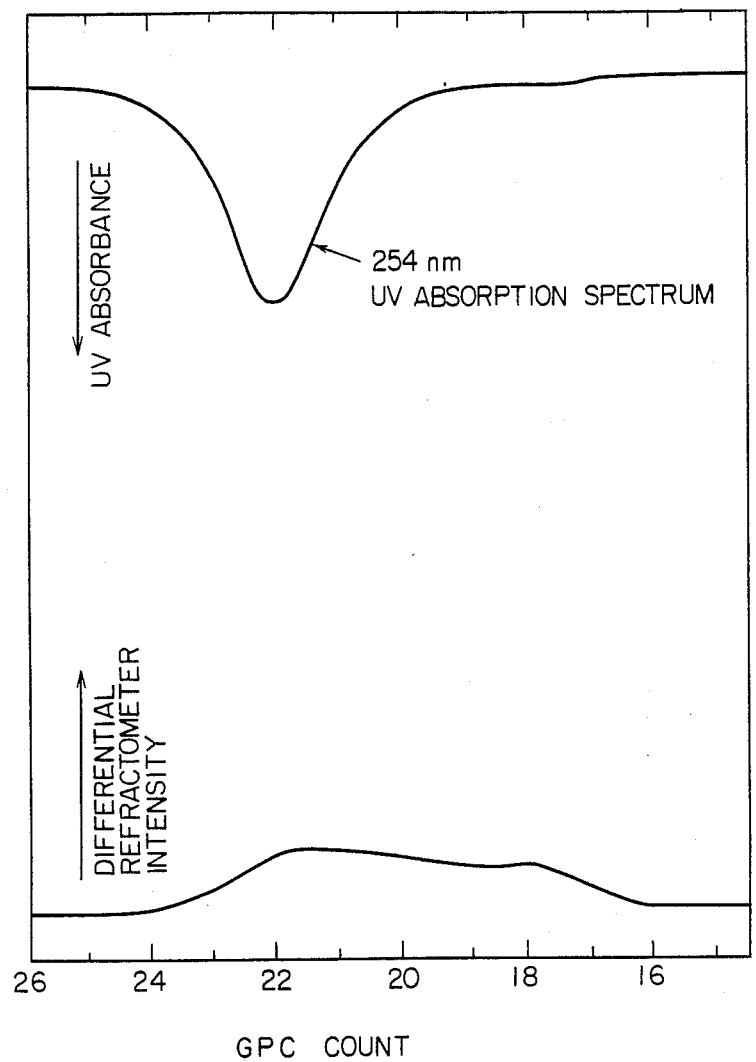
FIG. 6 is a GPC chart of a polymer obtained in Example 9.

The GPC chart of the modified polymer obtained is shown in FIG. 6. The presence of functional group in modified polymer is recognized from FIG. 6.

The proportion of functional group added per polymer chain was 53%.

EXAMPLE 10

A modified poly(1,3-butadiene) was obtained in the same manner as in Example 8, except that the amount of C-MDI was increased to 2.96 mmol.

In the modified polymer obtained, the UV absorption in GPC chart increased and the proportion of functional group added per polymer chain was 68%.

EXAMPLE 11

A modified poly(1,3-butadiene) was obtained in the same manner as in Example 8, except that no triisobutylaluminum was used and 16.7 mmol of carbon disulfide was used in place of the C-MDI as the component (f-1).

Figure 7:
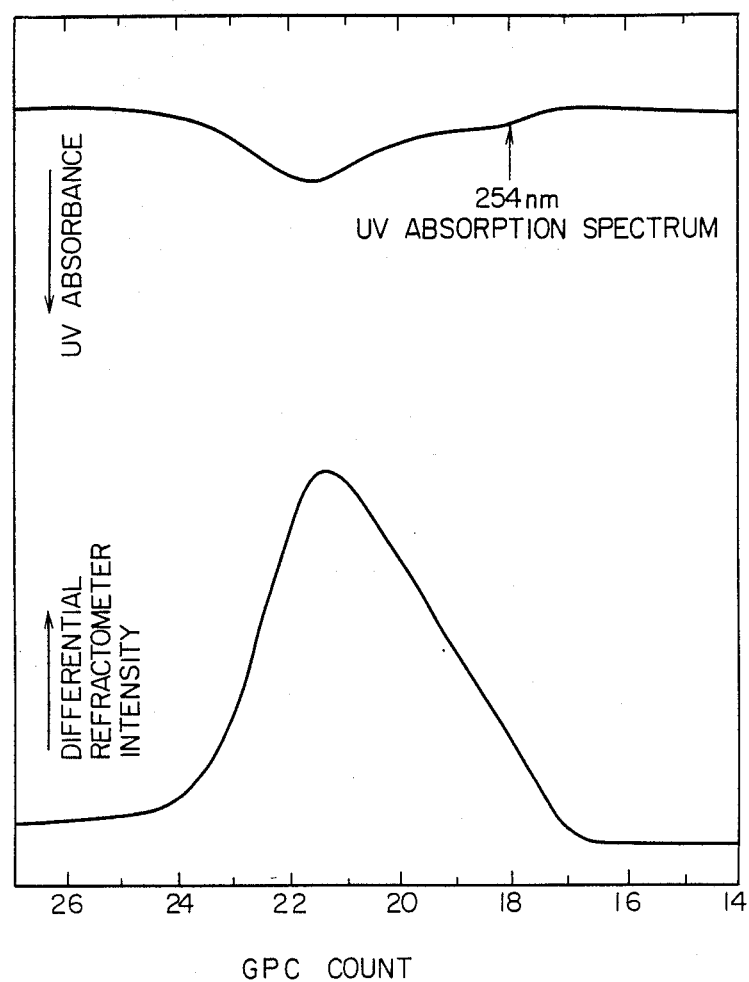
FIG. 7 is a GPC chart of a polymer obtained in Example 11.

The GPC chart of the modified polymer obtained is shown in FIG. 7.

FIG. 7 indicates the presence of UV absorption and accordingly the addition of carbon dioxide.

EXAMPLE 12

2.5 kg of cyclohexane and 500 g of 1,3-butadiene were placed in a reactor having an internal volume of 5 liters and equipped with a stirrer, in a nitrogen atmosphere. Separately, a catalyst was previously prepared by mixing (a) 0.93 mmol of neodymium 2-ethylhexanoate, (b) 27.7 mmol of triethylaluminum, (b) 10.2 mmol of diisobutylaluminum hydride, (c) 2.3 mmol of diethylaluminum chloride and (d) 1.85 mmol of acetylacetone in the presence of 4.6 mmol of 1,3-butadiene and aging the mixture at 40° C. for 30 minutes. This catalyst was added to the contents in the above reactor. The whole mixture was subjected to adiabatic reaction at 70° C. for 1.5 hours. The reaction conversion of 1,3-butadiene was almost 100%. For measurement of Mooney viscosity, a part of the polymerization mixture was taken out, coagulated and dried. The drying product [poly(1,3-butadiene)] had a Mooney viscosity of 30.

The polymerization mixture was cooled to 60° C. Thereto was added 5.1 mmol of C-MDI as the component (f-1). The mixture was stirred for 1 hour.

Then, 3.0 g of 2,6-di-t-butyl-p-cresol was added. The resulting mixture was coagulated using steam. The coagulation product was dried using a hot roll of 100° C. The thus obtained modified poly(1,3-butadiene) had such a microstructure that the cis-1,4 content was 97.8%, the trans-1,4 content was 1.0% bond and the vinyl content was 1.2%. It had a Mooney visocsity of 38.

The evaluation results on the properties of the vulcanizate of the modified polymer are shown in Table 2.

COMPARATIVE EXAMPLE 5

A poly(1,3-butadiene) was obtained in the same manner as in Example 12, except that no C-MDI as the component (f-1) was used.

absorption and accordingly the addition of styrene oxide as a result of its reaction with poly(1,3-butadiene).

EXAMPLE 14

A modified poly(1,3-butadiene) was obtained in the same manner as in Example 12, except that 15.3 mmol of carbon disulfide was used in place of the C-MDI of Example 12.

The polymerization results and the properties of the vulcanizate of the modified polymer obtained are shown in Table 2.

COMPARATIVE EXMAMPLE 7

A polymer was produced in the same manner as in Example 12, except that 5.1 mmol of carbon tetrachloride was used in place of the C-MDI as the component (f-1).

The polymerization results and the properties of the vulcanizate of the modified polymer obtained are shown in Table 2.

TABLE 2

|  | Example 12 | Comparative Example 5 | Comparative Example 6 | Example 14 | Comparative Example 7 |
| --- | --- | --- | --- | --- | --- |
| Type of modifying component | C-MDI | Not used | — | $CS_2$ | $CCl_4$ |
| Mooney viscosity before and after addition of modifying component |  |  |  |  |  |
| Before addition | 30 | 32 | 44 | 35 | 40 |
| After addition | 38 | — | — | 40 | 40 |
| Microstructure (%) |  |  |  |  |  |
| Cis-1,4 content | 97.8 | 97.4 | 95.3 | 97.1 | 96.5 |
| Trans-1,4 content | 1.0 | 1.2 | 2.1 | 1.8 | 1.8 |
| Vinyl content | 1.2 | 1.3 | 2.6 | 1.1 | 1.7 |
| Properties of vulcanizate |  |  |  |  |  |
| Tensile characteristics |  |  |  |  |  |
| 200% modulus (kgf/cm$^2$) | 112 | 96 | 91 | 118 | 95 |
| 300% modulus (kgf/cm$^2$) | 175 | 155 | 138 | 183 | 158 |
| Tensile strength (kgf/cm$^2$) | 242 | 214 | 195 | 248 | 217 |
| Elongation at break (%) | 420 | 390 | 400 | 380 | 400 |
| Hardness (JIS A) | 73 | 73 | 70 | 73 | 73 |
| Dunlop impact resilience (%) |  |  |  |  |  |
| Room temperature | 65 | 61 | 58 | 65 | 62 |
| 50° C. | 67 | 63 | 60 | 68 | 63 |
| 80° C. | 69 | 65 | 62 | 69 | 64 |
| Pico abrasion index* | 135 | 108 | 100 | 130 | 107 |

Note:
*In this measurement, the abrasion loss of a commercially available polybutadiene JSR ER01 measured according to the same Pico method was taken as a reference index of 100.

The microstructure of the polymer obtained as well as the evaluation results on the properties of the vulcanizate of the polymer obtained is shown in Table 2.

COMPARATIVE EXAMPLE 6

The properties of a vulcanizate of a commercially available polybutadiene (Polybutadiene BR-01 manufactured by Japan Synthetic Rubber Co., Ltd.) are shown in Table 2.

As is clear from Table 2, the modified polymer of this invention obtained by reacting C-MDI with the reactive polymer just after the polymerization using the lanthanum series rare earth metal catalyst are greatly improved in wear resistance, heat generation and tensile strength.

EXAMPLE 13

Figure 8:
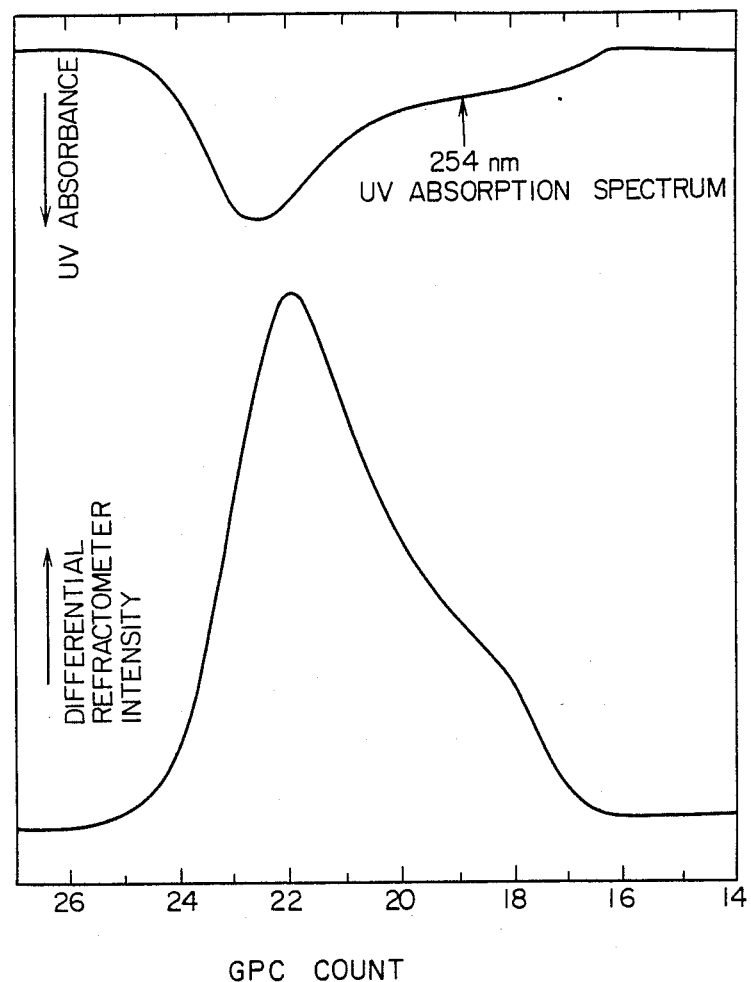
FIG. 8 is a GPC chart of a polymer obtained in Example 13.

Modification of poly(1,3-butadiene) was effected in the same manner as in Example 11, except that 16.7 mmol of styrene oxide as the component (f-2) was used in place of the carbon disulfide as the component (f-1). The GPC chart of the modified polymer obtained is shown in FIG. 8. It is seen from FIG. 8 that there is UV

EXAMPLE 15

The procedure of Example 8 was repeated, except that 3.33 mmol of 2,4,6-trichloro-1,3,5-triazine (hereinafter referred to as TCT) as the component (f) was used in place of the C-MDI to effect polymer modification.

The modified poly(1,3-butadiene) thus obtained had such a microstructure that the cis-1,4 content was 97.4%, the trans-1,4 content was 1.2% and the vinyl content was 1.4%.

Figure 9:
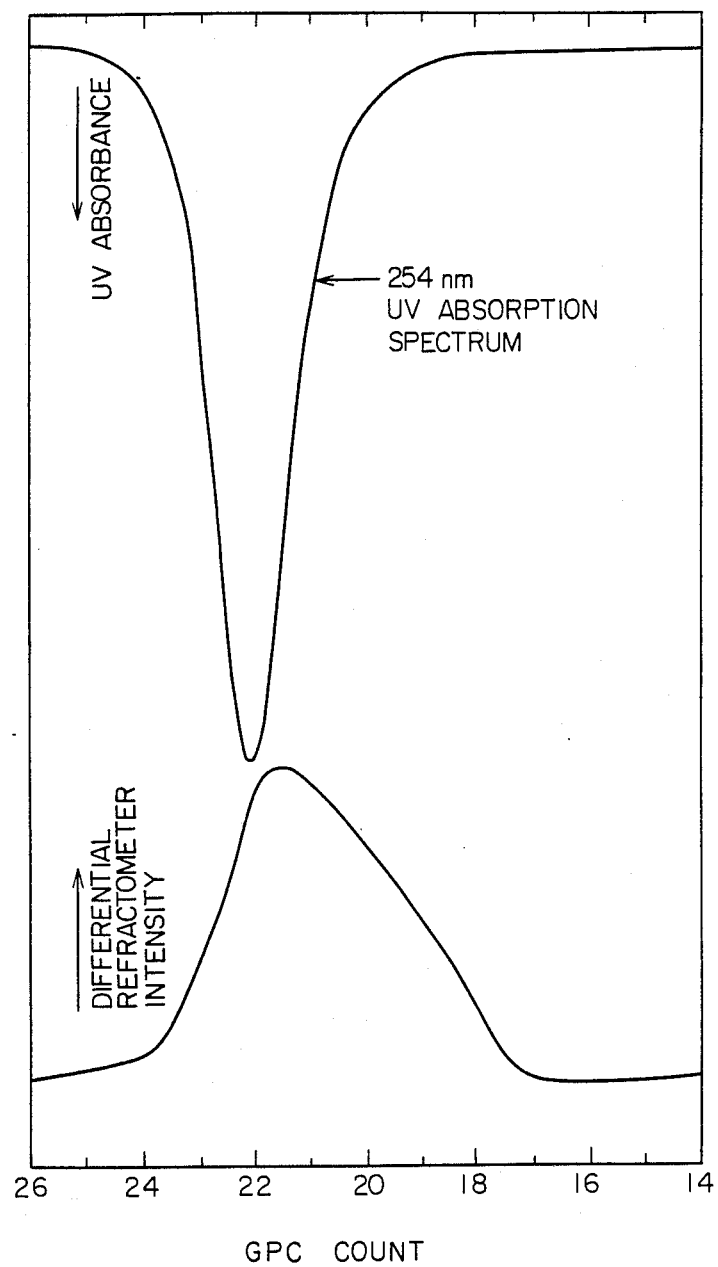
FIG. 9 is a GPC chart of a polymer obtained in Example 15.

The GPC chart of the modified polymer is shown in FIG. 9.

As is clear from FIG. 9, the molecular weight distribution determined by a differential refractometer and the molecular weight distribution determined by an ultraviolet ray of 254 nm appear in correlation to GPC count, and the UV absorption spectrum shows higher absorption intensities on the lower molecular weight side and correlates to the number of polymer terminals.

Figure 10:
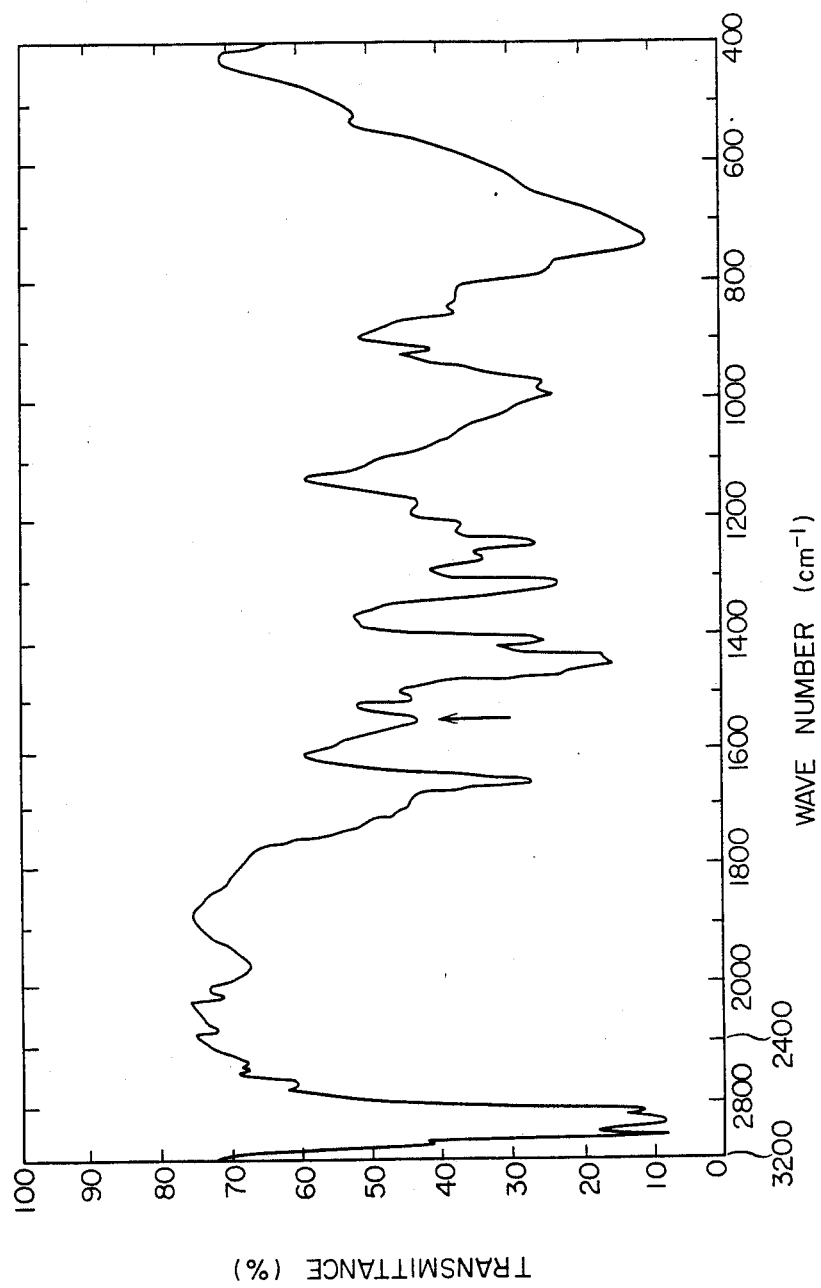
FIG. 10 is an IR absorption spectrum of the polymer.

The IR absorption spectrum of the modified polymer is shown in FIG. 10. As is clear from FIG. 10, an absorption spectrum based on 1,3,5-triazine ring appears in the vicinity of 1,540 cm$^{-1}$, which indicates that TCT was added to the polymer chain as a result of reaction.

EXAMPLE 16

A modified poly(1,3-butadiene) was produced in the same manner as in Example 15, except that benzoyl chloride as the component (g) was used in place of the TCT.

Figure 11:
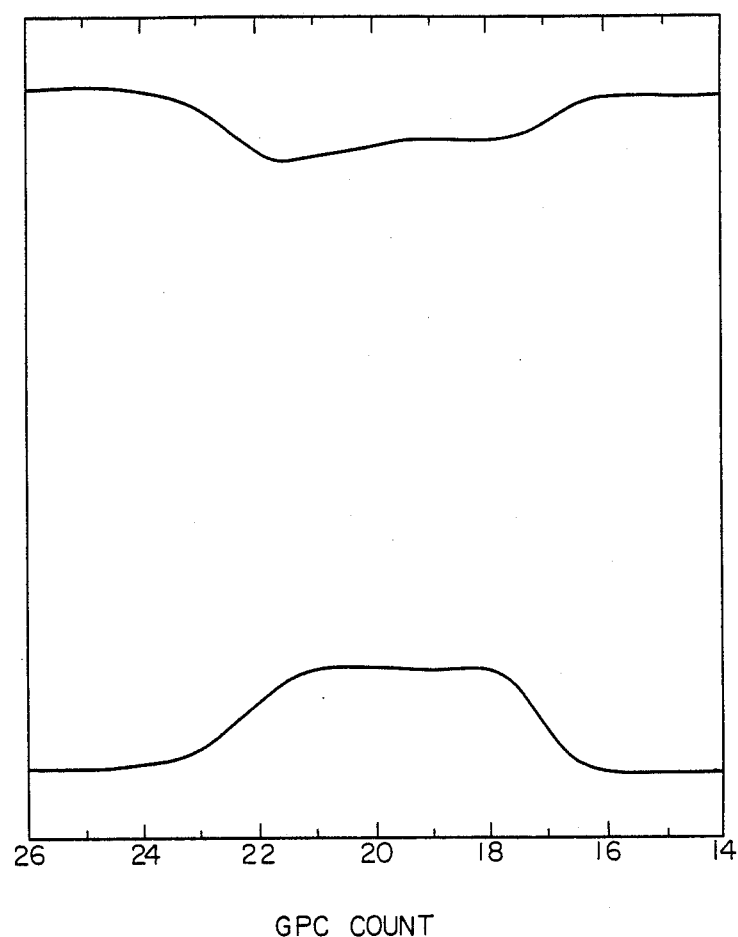
FIG. 11 is a GPC chart of a polymer obtained in Example 16.

The GPC chart of the modified polymer obtained is shown in FIG. 11, which indicates that functional groups have been added to polymer chain.

EXAMPLE 17

2.5 kg of cyclohexane and 350 g of 1,3-butadiene were placed in a reactor having an internal volume of 5 liters and equipped with a stirrer, in a nitrogen atmosphere. Separately, a catalyst was previously prepared by mixing (a) 0.43 mmol of neodymium 2-ethylhexanoate, (b) 12.1 mmol of triethylaluminum, (b) 9.5 mmol of diisobutylaluminum hydride, (c) 0.56 mmol of diethylaluminum chloride and (d) 0.86 mmol of acetylacetone in the presence of 4.6 mmol of 1,3-butadiene and aging the mixture at 40° C. for 30 minutes. This catalyst was added to the contents in the above reactor. The whole mixture was subjected to adiabatic reaction at 70° C. for 1.5 hours. The polymerization conversion of 1,3-butadiene was almost 100%. For Mooney viscosity measurement, a part of the polymerization mixture was taken out, coagulated and dried. The polymer obtained had a Mooney viscosity of 31.

The polymerization mixture was cooled to 60° C. Thereto was added 2.88 mmol of TCT as the component (g). The resulting mixture was stirred for 1 hour.

Then, 2.1 g of 2,6-di-t-butyl-p-cresol was added. The mixture was coagulated using steam. The coagulation product was dried using a hot roll of 100° C. The modified poly(1,3-butadiene) thus obtained had such a microstructure that the cis-1,4 content was 97.8%, the trans-1,4 content was 1.8% and the vinyl content was 1.2%. The polymer had a Mooney viscosity of 37.

The evaluation results on the properties of the vulcanizate of the modified polymer are shown in Table 3.

EXAMPLE 18

A modified poly(1,3-butadiene) was produced in the same manner as in Example 17, except that 8.6 mmol of benzoyl chloride was used in place of the TCT as the component (g). The microstructure of the modified polymer obtained and the evaluation results on the properties of the vulcanizate of the modified polymer are shown in Table 3.

TABLE 3

|  | Example 17 | Example 18 |
| --- | --- | --- |
| Type of modifying component | TCT | Benzoyl chloride |
| Mooney viscosity before and after addition of modifying component | | |
| Before addition | 31 | 28 |
| After addition | 37 | 31 |
| Microstructure (%) | | |
| Cis-1,4 content | 97.0 | 97.2 |
| Trans-1,4 content | 1.8 | 1.4 |
| Vinyl content | 1.2 | 1.4 |
| Properties of vulcanizate Tensile characteristics | | |
| 200% modulus (kgf/cm$^2$) | 118 | 102 |
| 300% modulus (kgf/cm$^2$) | 183 | 164 |
| Tensile strength (kgf/cm$^2$) | 255 | 224 |

TABLE 3-continued

|  | Example 17 | Example 18 |
| --- | --- | --- |
| Elongation at break (%) | 480 | 450 |
| Hardness (JIS A) | 72 | 71 |
| Dunlop impact resilience (%) | | |
| Room temperature | 65 | 65 |
| 50° C. | 68 | 67 |
| 80° C. | 69 | 68 |
| Pico abrasion index* | 141 | 128 |

Note:
*In this measurement, the abrasion loss of a vulcanizate of a commercially available JSR BR01 measured according to the same Pico method was taken as a reference index of 100.

EXAMPLE 19

The modified polymer (polymer A) obtained in accordance with Example 1, having a Mooney viscosity of 57 and having a cis-1,4 content of 97.1%, a trans-1,4 content of 1.5% and a vinyl content of 1.4% was blended with a natural rubber in the blending ratio shown in Table 4. The blend was vulcanized with the compounding recipe shown previously.

The properties of the vulcanizate are shown in Table 4.

EXAMPLES 20 to 22 AND COMPARATIVE EXMPLES 8 AND 9

Vulcanization was conducted in the same manner as in Example 19, except that the polymer A (see Table 5) was replaced by the following polymers B to F (see Table 5). The properties of each vulcanizate are shown in Table 4.

Polymer B: A modified polymer obtained in the same manner as mentioned above for the polymer A, except that triphenyltin chloride was used in place of the diphenyltin dichloride.

Polymer C: A modified polymer obtained in the same manner as mentioned above for the polymer A, except that phenyltin trichloride was used in place of the diphenyltin dichloride.

Polymer D: A modified polymer obtained in the same manner as mentioned above for the polymer A, except that dibutyltin dichloride was used in place of the diphenyltin dichloride.

Polymer E: An unmodified polymer obtained in the same manner as mentioned above for the polymer A, except that no modification with diphenyltin dichloride was conducted.

Polymer F: A polymer obtained in the same manner as mentioned above for the polymer A, except that the diphenyltin dichloride was replaced by carbon tetrachloride.

COMPARATIVE EXAMPLES 10 AND 11

Vulcanization was conducted in the same manner as in Example 19, except that a commercially available polybutadiene rubber (JSR BR 01 manufactured by Japan Synthetic Rubber Co., Ltd.) was used in place of the polymer A. The properties of each vulcanizate are shown in Table 4.

From the comparison of Examples 19 and 22 with Comparative Examples 8 to 11, it is clear that the rubber compositions of this invention have excellent wear resistance, good mechanical strengths and low heat generation characteristic.

COMPARATIVE EXAMPLE 12

Vulcanization was conducted in the same manner as in Example 19, except that the blending ratio of the polymer A to the natural rubber was changed to 10:90. The properties of the vulcanizate obtained are shown in Table 4, which indicates that the effect of this invention cannot be expected when the rubber composition contains a too small amount of the polymer A.

num compound represented by the general formula, $AlR^1R^2R^3$ (wherein $R^1$, $R^2$ and $R^3$, which may be same or different, are hydrogen atoms or hydrocarbon groups of 1 to 8 carbon atoms and at least one of $R^1$, $R^2$ and $R^3$ is said hydrocarbon group) and, if necessary, (c) a Lewis acid and/or (d) a Lewis base and (II) modifying the resulting reactive polymer with a modifying compound selected from the group consisting of an isocyanate compound, thioisocyanate compound, carbon di-

TABLE 4

|  | Example 19 | Comparative Example 8 | Comparative Example 9 | Comparative Example 10 |
|---|---|---|---|---|
| Type of polymer (parts) | | | | |
| Polymer A | 50 | | | |
| Polymer B | | | | |
| Polymer C | | | | |
| Polymer D | | | | |
| Polymer E | | 50 | | |
| Polymer F | | | 50 | |
| JSR-BR01 | | | | 50 |
| Natural rubber (RSS No. 3) | 50 | 50 | 50 | 50 |
| Properties of vulcanizate | | | | |
| Tensile characteristics | | | | |
| 300% modulus (kgf/cm$^2$) | 121 | 113 | 106 | 114 |
| Tensile strength (kgf/cm$^2$) | 262 | 251 | 248 | 254 |
| Elongation at break (%) | 520 | 530 | 490 | 500 |
| Hardness (JIS A) | 63 | 63 | 64 | 65 |
| Dunlop impact resilience (%) | | | | |
| Room temperature | 59 | 56 | 56 | 55 |
| 50° C. | 62 | 58 | 59 | 57 |
| 80° C. | 63 | 60 | 61 | 59 |
| Pico abrasion index* | 125 | 108 | 106 | 100 |

| Example 20 | Example 21 | Example 22 | Comparative Example 11 | Comparative Example 12 |
|---|---|---|---|---|
| | | | | 10 |
| 30 | | | | |
| | 70 | | | |
| | | 70 | | |
| | | | 70 | |
| 70 | 30 | 30 | 30 | 90 |
| 125 | 109 | 110 | 106 | 145 |
| 274 | 231 | 225 | 227 | 295 |
| 480 | 520 | 510 | 490 | 450 |
| 64 | 63 | 64 | 65 | 64 |
| 54 | 60 | 60 | 59 | 53 |
| 56 | 63 | 62 | 61 | 54 |
| 58 | 66 | 65 | 64 | 55 |
| 118 | 132 | 135 | 105 | 94 |

Note:
*In this measurement, the abrasion loss of a vulcanizate of a rubber composition [50% by weight of a polybutadiene rubber (JSR BR01) and 50% by weight of a natural rubber (RSS No. 3)] measured according to the same Pico method was taken as a reference index of 100.

TABLE 5

|  | Polymer A | Polymer B | Polymer C | Polymer D | Polymer E | Polymer F |
|---|---|---|---|---|---|---|
| Type of modifying component | $\phi_2SnCl_2$ | $\phi_3SnCl$ | $\phi SnCl_3$ | $(n-Bu)_2SnCl_2$ | Not used | $CCl_4$ |
| Mole ratio of modifying component/component (a) | 2.5 | 15 | 5 | 10 | — | 30 |
| Mooney viscosity before and after addition of modifying component | | | | | | |
| Before addition | 43 | 35 | 32 | 28 | 43 | 46 |
| After addition | 57 | 42 | 48 | 41 | — | 46 |
| Microstructure (%) | | | | | | |
| Cis-1,4 content | 97.1 | 97.0 | 96.8 | 97.3 | 96.9 | 96.8 |
| Trans-1,4 content | 1.5 | 1.6 | 1.4 | 1.5 | 1.4 | 1.4 |
| Vinyl content | 1.4 | 1.4 | 1.8 | 1.2 | 1.7 | 1.8 |

What is claimed is:

1. A process for producing a modified conjugated diene polymer which comprises the steps of (I) polymerizing a conjugated diene in an inert organic solvent in the presence of a catalyst comprising (a) a lanthanum series rare earth metal compound, (b) an organoaluminum compound represented by the general formula, $AlR^1R^2R^3$ (wherein $R^1$, $R^2$ and $R^3$, which may be same or different, are hydrogen atoms or hydrocarbon groups of 1 to 8 carbon atoms and at least one of $R^1$, $R^2$ and $R^3$ is said hydrocarbon group) and, if necessary, (c) a Lewis acid and/or (d) a Lewis base and (II) modifying the resulting reactive polymer with a modifying compound selected from the group consisting of an isocyanate compound, thioisocyanate compound, carbon disulfide and epoxy compound.

2. A process according to claim 1, wherein the conjugated diene is 1,3-butadiene, isoprene or a mixture thereof.

3. A process according to claim 1, wherein the lanthanum series rare earth element compound (a) is a compound represented by the general formula, $LnY^2_3$ (wherein Ln is at least one lanthanum series rare earth element having an atomic number of 57 to 71 and $Y^2$ is a hydrocarbon residue, an alkoxide residue, a thioalkoxide residue, an amide residue, a phosphoric acid salt residue, a phosphorous acid salt residue or a carboxylic acid salt residue.

4. A process according to claim 3, wherein the Ln is at least one member selected from the group consisting of cerium, preseodyminum, neodymium and gadolinium.

5. A process according to claim 3, wherein the Ln is neodymium.

6. A process according to claim 3, wherein the $LnY^2_3$ compound is a compound represented by the general formula, $LnR_3$, $Ln(OR)_3$, $Ln(SR)_3$, $Ln(NR_2)_3$,

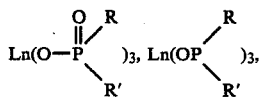

$LnX_3$ or $(RCOO)_3Ln$ (wherein Ln has the same definition as given above, R and R', which may be same or different, are hydrocarbon groups of 1 to 20 carbon atoms, and X is a halogen atom).

7. A process according to claim 3, wherein the lanthanum series rare earth element compound (a) is selected from the group consisting of neodymium trichloride, didymium trichloride (the didymium is a rare earth metal mixture consisting of 72% by weight of neodymium, 20% by weight of lanthanum and 8% by weight of praseodymium), neodymium 2-ethylhexanoate, didymium 2-ethylhexanoate, neodymium naphthenate, neodymium 2,2-diethylhexanoate, neodymium trimethacrylate and polymers of neodymium trimethacrylate.

8. A process according to claim 1, wherein the organoaluminum compound (b) is trimethylaluminum, triethylaluminum, triisopropylaluminum, tributylaluminum, triisobutylalauminum, trihexylaluminum, tricyclohexylaluminum, diisobutylaluminum hydride, diethylaluminum hydride, dipropylaluminum hydride, ethylaluminum dihydride, propylaluminum dihydride or isobutylaluminum dihydride.

9. A process according to claim 1, wherein the Lewis acid (c) is selected from the group consisting of dimethylaluminum chloride, diethylaluminum chloride, dibutylaluminum chloride, ethylaluminum sesquichloride, ethylaluminum dichloride, and bromides and iodides corresponding to them halogen elements, tin halides and titanium halides.

10. A process according to claim 1, wherein the Lewis base (d) is selected from the group consisting of acetylacetone, tetrahydrofuran, pyridine, N,N-dimethylformamide, thiophene, diphenyl ether, triethylamine, organic phosphorus compounds and mono- or dihydric alcohols.

11. A process according to claim 1, wherein the mole ratio of the component (b)/the component (a) is 10 to 150.

12. A process according to claim 11, wherein the mole ratio of the component (c)/the component (a) is from 0 to 6.

13. A process according to claim 1, wherein the mole ratio of the component (c)/the component (a) is from 0.5 to 5.0.

14. A process according to claim 1, wherein the mole ratio of the component (d)/the component (a) is from 1 to 15.

15. A process according to claim 1, wherein the catalyst is prepared previously by mixing the components (a) to (d) in the presence or absence of a conjugated diene in a polymerization solvent, subjecting the mixture to reaction and then aging the reaction mixture.

16. A process according to claim 15, wherein the polymerization solvent is at least one member selected from the group consisting of aromatic hydrocarbons, aliphatic hydrocarbons, alicyclic hydrocarbons and halogenated hydrocarbons.

17. A process according to claim 1, wherein the polymerization in the step (I) is conducted at $-20°$ C. to $150°$ C.

18. A process according to claim 16, wherein the monomer concentration in the solvent is 5 to 50% by weight.

19. A process according to claim 1, wherein the modification in the step (II) is conducted at $160°$ C. or less for 0.1 to 10 hours with stirring.

20. A process according to claim 1, wherein the mole ratio of the modifying compound /the component (a) is from 0.1 to 200.

21. The process of claim 1, wherein the modifying compound is an isocyanate or thioisocyanate compound.

22. The process of claim 1, wherein the modifying compound is carbon disulfide.

23. The process of claim 1, wherein the modifying compound is an epoxy compound.

* * * * *